(12) United States Patent
Martin

(10) Patent No.: US 10,359,068 B2
(45) Date of Patent: Jul. 23, 2019

(54) FASTENER SYSTEM FOR USE IN SECURING AN OBJECT TO A CHANNEL BEAM

(71) Applicant: Michael A. Martin, Seabrook, NH (US)

(72) Inventor: Michael A. Martin, Seabrook, NH (US)

( * ) Notice: Subject to any disclaimer, the term of this patent is extended or adjusted under 35 U.S.C. 154(b) by 157 days.

(21) Appl. No.: 15/615,319

(22) Filed: Jun. 6, 2017

(65) Prior Publication Data
US 2018/0347615 A1    Dec. 6, 2018

(51) Int. Cl.
*F16B 37/04*    (2006.01)
*F16B 39/26*    (2006.01)
*E04B 9/18*     (2006.01)
*E04C 3/04*     (2006.01)

(52) U.S. Cl.
CPC ............ *F16B 37/046* (2013.01); *F16B 39/26* (2013.01); *E04B 9/183* (2013.01); *E04C 3/04* (2013.01); *E04C 2003/0421* (2013.01); *E04C 2003/0434* (2013.01); *E04C 2003/0473* (2013.01)

(58) Field of Classification Search
CPC ........ F16B 21/10; F16B 21/125; F16B 37/04; F16B 37/045; F16B 37/046; F16B 37/12; F16B 39/26; E04B 9/183

USPC .......... 411/85, 132, 161, 343, 347, 432, 438
See application file for complete search history.

(56) References Cited

U.S. PATENT DOCUMENTS

| 2,329,815 | A | * | 9/1943 | Attwood | ................ A47B 57/54 108/106 |
| 2,345,650 | A | * | 4/1944 | Attwood | .............. B62D 33/044 211/182 |
| 2,696,139 | A | | 12/1954 | Atwood | |
| 4,146,074 | A | | 3/1979 | Kowalski | |
| 4,545,697 | A | * | 10/1985 | Verdenne | .............. F16B 37/042 403/230 |
| 4,575,295 | A | * | 3/1986 | Rebentisch | ........... F16B 37/046 411/427 |
| 4,666,355 | A | | 5/1987 | Stover | |
| 4,840,525 | A | | 6/1989 | Rebentisch | |
| 4,917,553 | A | * | 4/1990 | Muller | .................. F16B 37/046 411/104 |
| 6,872,038 | B2 | | 3/2005 | Westlake | |
| 7,246,547 | B2 | * | 7/2007 | Van Walraven | ........ B25B 13/02 411/104 |

* cited by examiner

*Primary Examiner* — Roberta S Delisle
(74) *Attorney, Agent, or Firm* — Foley Hoag LLP; Rajesh Vallabh

(57) ABSTRACT

A fastener system is disclosed for use in securing an object to a channel beam such as UNISTRUT-type channel beam. The fastener system includes a spring nut installed in the channel beam and a spring nut clip removably secured to the spring nut. The spring nut clip inhibits rotation of the spring nut, particularly when a fastener is being removed from the spring nut.

16 Claims, 5 Drawing Sheets

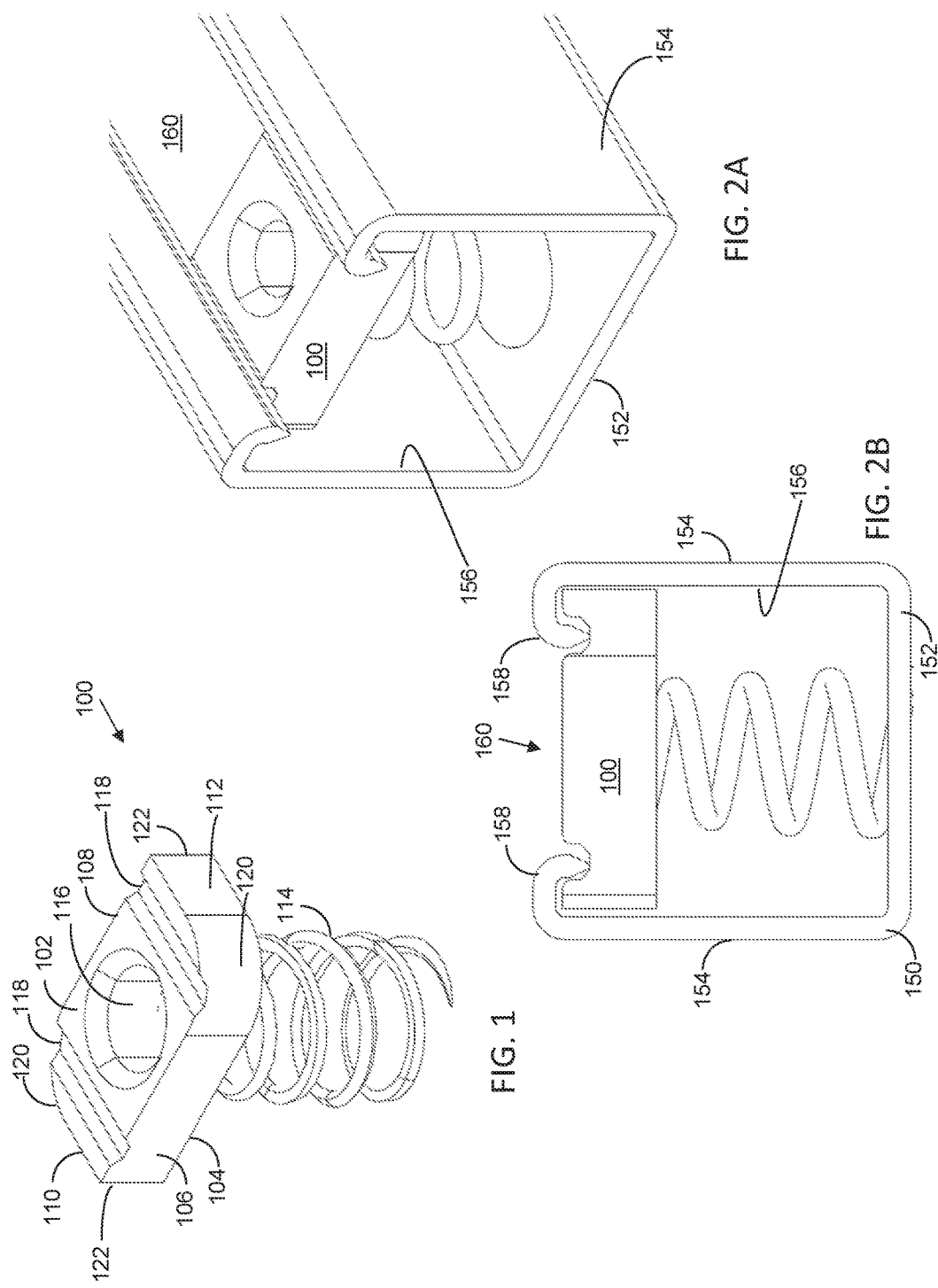

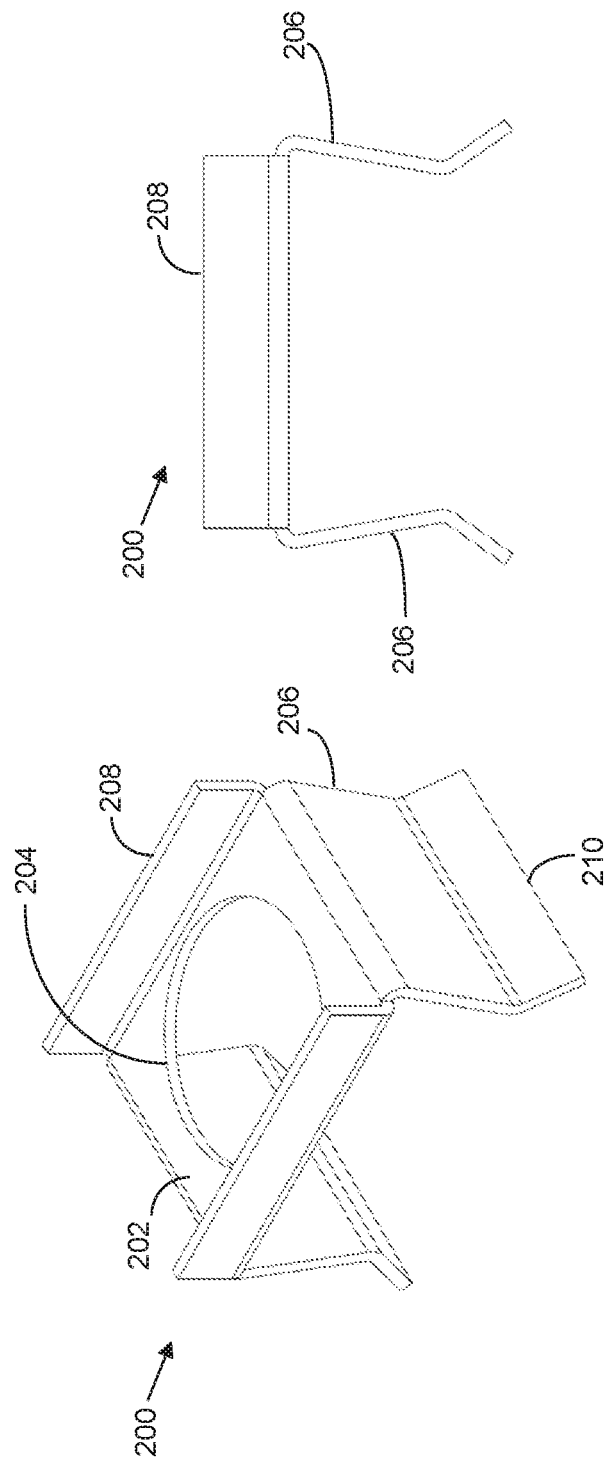

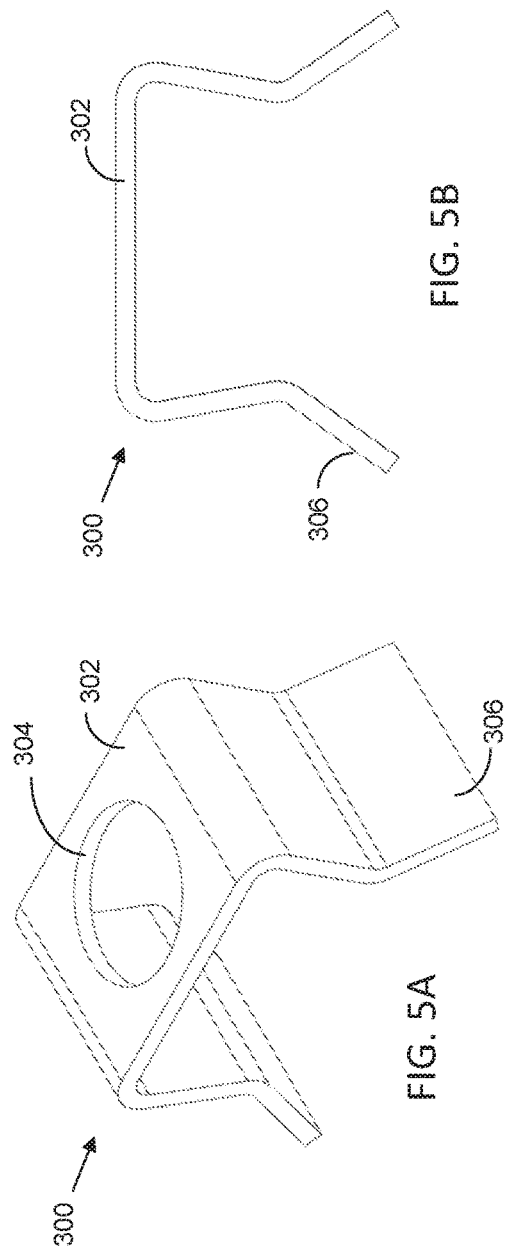
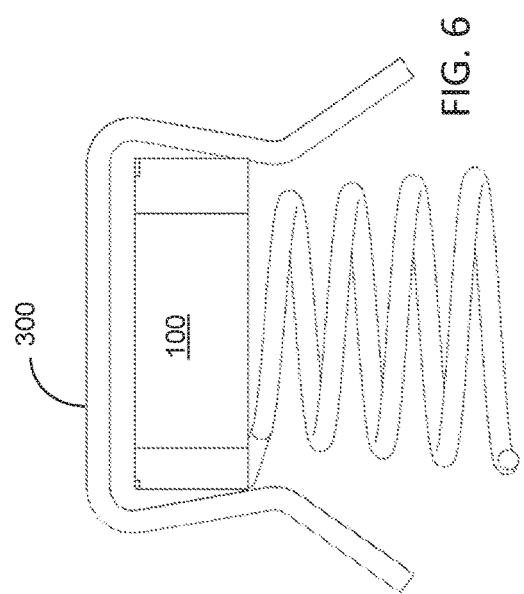

FASTENER SYSTEM FOR USE IN SECURING AN OBJECT TO A CHANNEL BEAM

BACKGROUND

The present application relates generally to fasteners for fastening objects to channel beams.

Objects such as brackets, shelves, fixtures, conduits, pipes, wire cabling etc. are commonly fastened to and supported by channel beams such as UNISTRUT-type channel beams. Such channel beams include a base and two sidewalls forming a channel. The ends of the sidewalls have inwardly facing flanges defining a slot, which opens to the channel. An elongated spring nut (which is narrower, but longer than the slot) is used for securing objects to the channel beam. The spring nut is first aligned with and inserted through the slot at a desired location along the length of the channel beam. It is then turned clockwise 90° to a crosswise position with the outside faces of the spring nut engaging the sidewalls defining the channel. Once the spring nut is in this installed position, the object is secured to the spring nut by screwing a threaded fastener through the threaded hole in the spring nut.

The spring nut includes two rounded diagonally opposite corners to enable the 90° clockwise rotation of the spring nut into the installed position. Further clockwise rotation of the spring nut is prevented by the other diagonally opposite corners, which are not rounded and which engage the sidewalls of the channel. Thus as the threaded fastener is screwed clockwise into the spring nut, the spring nut remains stationary in its desired position, enabling the fastener to be secured to the spring nut. However, if there is a need later to remove the object from the channel beam, unscrewing the threaded fastener counterclockwise can result in the spring nut rotating in the counterclockwise direction due to the rounded diagonally opposite corners of the spring nut. This can make it difficult to remove the threaded fastener and can also lead to the spring nut inadvertently falling out of the channel beam.

BRIEF SUMMARY OF THE DISCLOSURE

In accordance with one or more embodiments, a fastener system is disclosed for use in securing an object to a channel beam. The channel beam has a base and two sidewalls extending from the base to form a channel. The ends of the sidewalls have inwardly facing flanges defining a slot opening to the channel. The fastener system includes a spring nut and a spring nut clip. The spring nut has opposite top and bottom faces, opposite front and back faces, and opposite first and second side faces. The front and back faces have a lengthwise dimension extending between the first and second side faces, which is greater than the lengthwise dimension of the first and second side faces extending between the front and back faces. A coil spring is secured to the bottom face of the spring nut. The spring nut includes a generally centrally located threaded opening on the top face for receiving a fastener to be used to fasten the object to the channel beam. The spring nut can be inserted in a desired position in the channel through the slot when front and back faces are aligned with the sidewalls of the channel beam, and then rotated to an installed position wherein that the first and second side faces are aligned with the sidewalls of the channel beam and the top face engages the inwardly facing flanges of the sidewalls. The coil spring biases the top face toward the inwardly facing flanges. The spring nut clip including a top portion having an opening therein and resiliently deformable legs extending from the top portion. The spring nut clip is removably secured to the spring nut when the spring nut is in the installed position in the channel beam such that the top portion of the spring nut clip is disposed over a portion of the top face of the spring nut, the opening in the top portion of the spring nut clip provides access to the threaded opening in the spring nut, and the legs of the spring nut clip are clipped to the front and back faces of the spring nut. The top portion of the spring nut clip is configured to engage the inwardly facing flanges of the channel beam to inhibit counterclockwise rotation of the spring nut from the installed position when the fastener is being removed from the spring nut.

In accordance with one or more embodiments, a method is disclosed for securing an object to a channel beam. The channel beam has base and two sidewalls extending from the base to form a channel. The ends of the sidewalls have inwardly facing flanges defining a slot opening to the channel. The method includes the steps of: (a) installing a spring nut in the channel beam, the spring nut having opposite top and bottom faces, opposite front and back faces, and opposite first and second side faces, wherein the front and back faces have a lengthwise dimension extending between the first and second side faces, which is greater than the lengthwise dimension of the first and second side faces extending between the front and back faces, the spring nut including a coil spring secured to the bottom face, the spring nut also including a generally centrally located threaded opening on the top face, wherein installing the spring nut in the channel beam comprises inserting the spring nut in a desired position in the channel through the slot when front and back faces are aligned with the sidewalls of the channel beam, and rotating the spring nut to an installed position wherein that the first and second side faces are aligned with the sidewalls of the channel beam and the top face engages the inwardly facing flanges of the sidewalls, and wherein the coil spring biases the top face of the spring nut toward the inwardly facing flanges of the channel beam; (b) installing a spring nut clip on the spring nut when the spring nut is in the installed position in the channel beam, said spring nut clip including a top portion having an opening therein and resiliently deformable legs extending from the top portion, wherein installing said spring nut clip on the spring nut comprises removably securing the spring nut clip to the spring nut such that the top portion of the spring nut clip is disposed over a portion of the top face of the spring nut, and the opening in the top portion of the spring nut clip provides access to the threaded opening in the spring nut, and the legs of the spring nut clip are resiliently clipped to the front and back faces of the spring nut, such that when the spring nut clip is installed on the spring nut, the top portion of the spring nut clip is engageable with the inwardly facing flanges of the channel beam to inhibit counterclockwise rotation of the spring nut from the installed position when the fastener is being removed from the spring nut; and (c) attaching an object to the channel beam by screwing a threaded fastener into the threaded opening in the spring nut through the opening in the spring nut clip to secure the object to the channel beam.

In accordance with one or more further embodiments, a fastener system includes a channel beam, a spring nut, and a spring nut clip. The channel beam has a base and two sidewalls extending from the base to form a channel. The ends of the sidewalls have inwardly facing flanges defining a slot opening to the channel. The spring nut has opposite top and bottom faces, opposite front and back faces, and opposite first and second side faces. The front and back faces have a lengthwise dimension extending between the first and second side faces which is greater than the lengthwise dimension of the first and second side faces extending between the front and back faces. The spring nut includes a coil spring secured to the bottom face. The spring nut also includes a generally centrally located threaded opening on the top face for receiving a fastener to be used to fasten the object to the channel beam. The spring nut can be inserted in a desired position in the channel through the slot when front and back faces are aligned with the sidewalls of the channel beam, and then rotated to an installed position wherein that the first and second side faces are aligned with the sidewalls of the channel beam and the top face engages the inwardly facing flanges of the sidewalls, and wherein the coil spring biases the top face toward the inwardly facing flanges. The spring nut clip is removably attached to the spring nut and is engageable with the inwardly facing flanges of the channel beam for inhibiting counterclockwise rotation of the spring nut from the installed position when the fastener is being removed from the spring nut.

BRIEF DESCRIPTION OF THE DRAWINGS

FIG. 1 is a perspective view of an exemplary conventional spring nut.

FIGS. 2A and 2B are perspective and front views, respectively, showing the spring nut of FIG. 1 installed in a conventional channel beam.

FIGS. 3A and 3B are perspective and side views, respectively, of an exemplary spring nut clip in accordance with one or more embodiments.

FIGS. 5A and 5B are perspective and front views, respectively, of another exemplary spring nut clip in accordance with one or more embodiments.

FIG. 6 is a front view of the spring nut clip of FIGS. 5A and 5B installed on a spring nut in accordance with one or more embodiments.

DETAILED DESCRIPTION

Figure 4C:
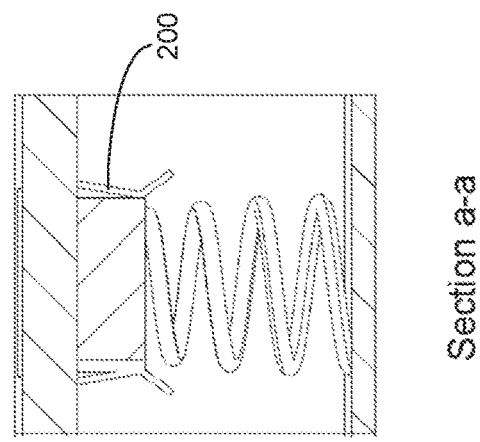
FIG. 4C is a cross-section view taken generally along line a-a of FIG. 4B.

FIG. 1 illustrates an example of a conventional spring nut 100. The spring nut 100 has opposite top and bottom faces 102, 104, opposite front and back faces 106, 108, and opposite first and second side faces 110, 112. The spring nut 100 is elongated in that the lengthwise dimension of the front and back faces 106, 108 is longer than the lengthwise dimension of the first and second side faces 110, 112. While the spring nut 100 shown in FIG. 1 has a generally rectangular shape, it may alternatively have a parallelogram shape.

A coil spring 114 is secured to the bottom face 104 of the spring nut 100.

The top face 102 of the spring nut 100 includes a generally centrally located threaded opening 116 for receiving a threaded fastener (not shown) to be used to fasten an object to a channel beam.

Two parallel grooves 118 are provided in the top face 102 of the spring nut 100. As will be discussed below, inwardly facing flanges of the channel beam are seated in the grooves when the spring nut 100 is in an installed position in the channel beam.

The spring nut 100 includes two rounded diagonally opposite corners 120 to enable a 90° clockwise rotation of the spring nut 100 into an installed position as will be described below. The other diagonally opposite corners 122 are not rounded in order to inhibit clockwise rotation of the spring nut 100 once it is in the installed position in the channel beam. Rounded corners would generally not be needed if the spring nut has a parallelogram shape.

FIGS. 2A and 2B illustrate the conventional spring nut 100 of FIG. 1 installed in a conventional channel beam 150. The channel beam 150 includes a base 152 and two sidewalls 154 extending from the base to form a channel 156. The ends of the sidewalls 154 have inwardly facing (i.e., in-turned) flanges 158, which define a slot or opening 160 therebetween leading into the channel 156.

The spring nut 100 can be inserted in a desired position in the channel 156 through the slot 160 when front and back faces 106, 108 are aligned with the sidewalls 154 of the channel beam 150. The spring nut 100 is then rotated 90° clockwise to an installed position (shown in FIGS. 2A and 2B) wherein that the first and second side faces 110, 112 are now aligned with the sidewalls 154 of the channel beam 150 and the top face 102 engages the inwardly facing flanges 158 of the sidewalls 154. The coil spring 114 biases the top face 102 toward the inwardly facing flanges 158. The inwardly facing flanges 158 are seated in the two parallel grooves 118 in the top face 102 of the spring nut 100.

Figure 4B:
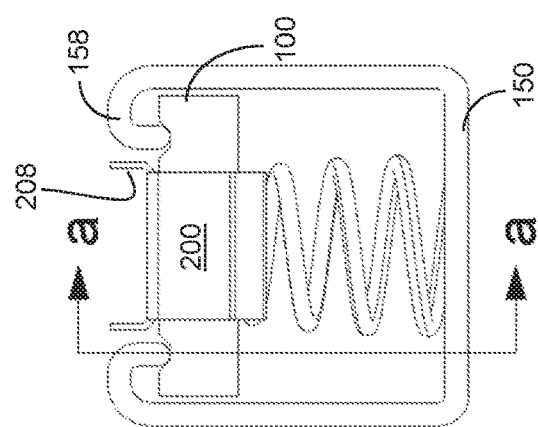
FIGS. 4A and 4B are perspective and front views, respectively, of the spring nut clip of FIGS. 3A and 3B installed on a spring nut in a channel beam in accordance with one or more embodiments.
Figure 4A:
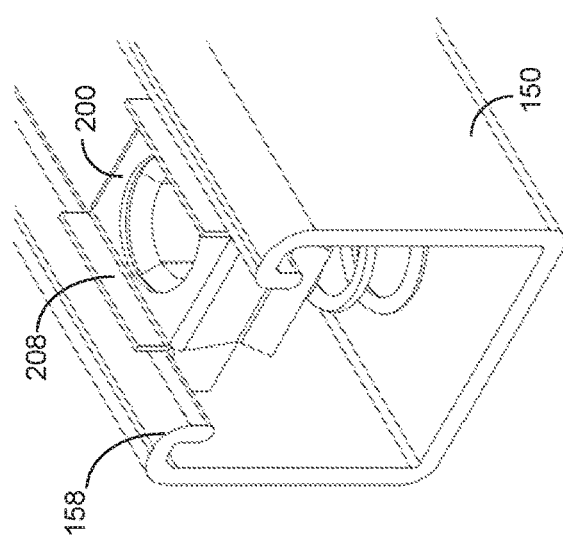

FIGS. 3A and 3B illustrate a spring nut clip 200 in accordance with one or more embodiments, which can be installed on the spring nut 100 as shown in FIGS. 4A-4C. The spring nut clip 200 includes a top portion 202 having an opening 204 therein. Two resiliently deformable legs 206 extend away from the top portion 202. The spring nut clip 200 is removably secured to the spring nut 100 when the spring nut 100 is in the installed position in the channel beam 150 such that the top portion 202 of the spring nut clip is disposed over on the top face 102 of the spring nut 100. The opening 204 in the top portion 202 of the spring nut clip 200 provides access to the threaded opening 116 in the spring nut 100. The legs 206 of the spring nut clip 200 are resiliently clipped to the front and back faces 106, 108 of the spring nut 100.

The top portion 202 of the spring nut clip includes two raised elements 208 that are configured to engage the inwardly facing flanges 158 of the channel beam 150 once the spring nut clip 200 has been installed. The raised elements 208 inhibit counterclockwise rotation of the spring nut 100 from the installed position when any fastener screwed into the spring nut 100 is being removed.

The legs 206 of the spring nut clip are flared at the free ends 210 thereof for ease of insertion on and/or removal of the spring nut clip 200 from the spring nut 100.

Figure 7:
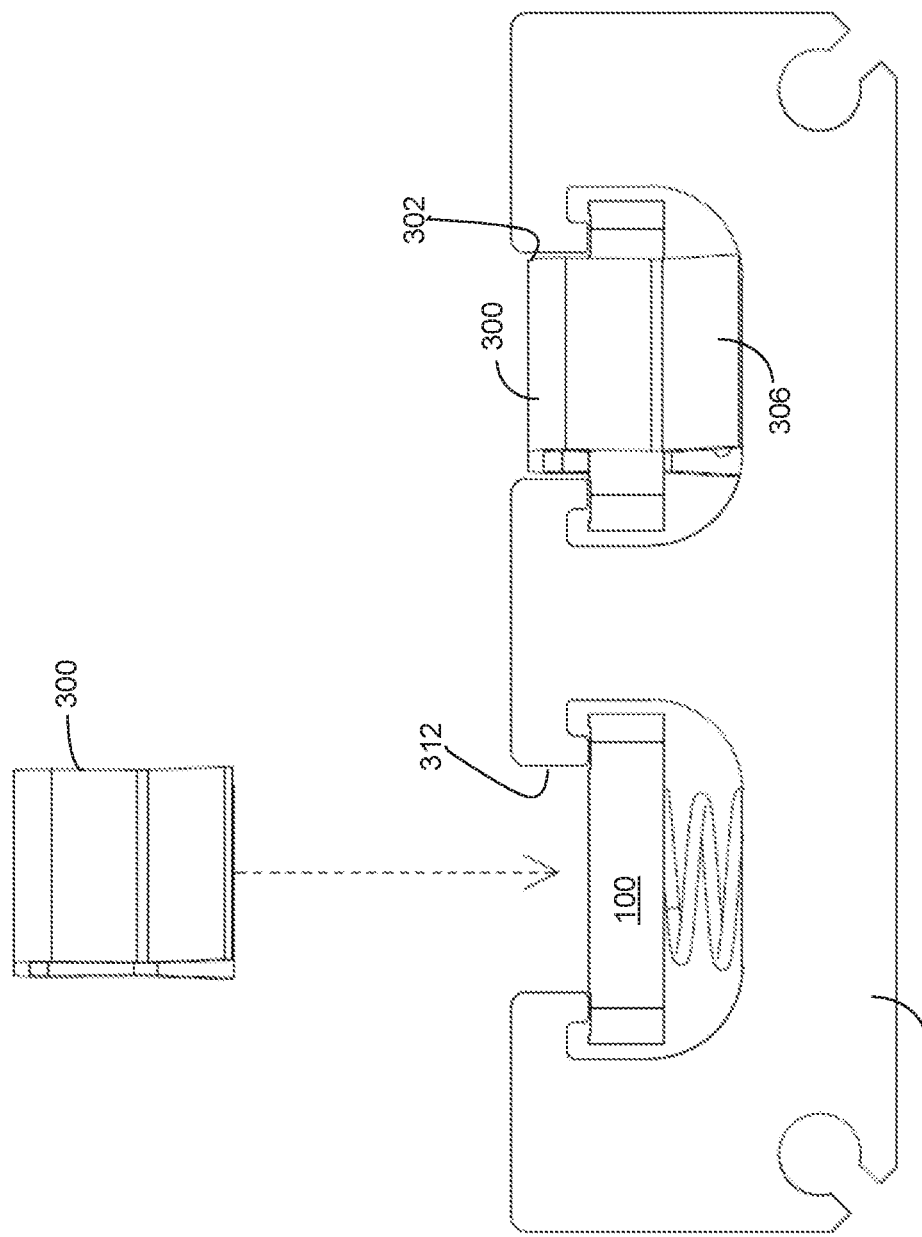
FIG. 7 is a front view of a channel beam illustrating a process of installing the spring nut clip of FIGS. 5A and 5B on a channel nut in a channel beam in accordance with one or more embodiments.

FIGS. 5A, 5B, 6, and 7 illustrate an alternate spring nut clip 300 in accordance with one or more embodiments. The spring nut clip 300 includes a top portion 302 having an opening 304 therein. Two resiliently deformable legs 306 extend away from the top portion 302. The spring nut clip 300 differs from the spring nut clip 200 of FIGS. 3A and 3B in that the spring nut clip 300 does not include the raised elements 208 of FIGS. 3A and 3B. Instead, the top portion 302 of the spring nut clip 300 is substantially flat. As shown in FIG. 7, which shows installation of the spring nut clip 300 on the spring nut 100 in a channel beam 310, the sides of the top portion 302 engage the inwardly facing flanges 312 of the channel beam 310 to inhibit rotation of the spring nut 100 when a fastener is being removed.

By way of example, the spring nut clips disclosed herein are manufactured by stamping and forming a sheet of spring steel, e.g., a 22-31-gauge sheet of stainless steel. In accordance with one or more alternate embodiments, the spring nut clips disclosed herein comprise molded plastic pieces.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. A fastener system for use in securing an object to a channel beam, the channel beam having base and two sidewalls extending from the base to form a channel, and wherein ends of the sidewalls have inwardly facing flanges defining a slot opening to the channel, the fastener system comprising:
    a spring nut having opposite top and bottom faces, opposite front and back faces, and opposite first and second side faces,
    wherein the front and back faces have a lengthwise dimension extending between the first and second side faces which is greater than the lengthwise dimension of the first and second side faces extending between the front and back faces,
    the spring nut including a coil spring secured to the bottom face,
    the spring nut including a generally centrally located threaded opening on the top face for receiving a fastener to be used to fasten the object to the channel beam,
    wherein the spring nut can be inserted in a desired position in the channel through the slot when front and back faces are aligned with the sidewalls of the channel beam, and then rotated to an installed position wherein that the first and second side faces are aligned with the sidewalls of the channel beam and the top face engages the inwardly facing flanges of the sidewalls, and wherein the coil spring biases the top face toward the inwardly facing flanges; and
    a spring nut clip including a top portion having an opening therein and resiliently deformable legs extending from the top portion, said spring nut clip being removably secured to the spring nut when the spring nut is in the installed position in the channel beam such that the top portion of the spring nut clip is disposed over a portion of the top face of the spring nut, and the opening in the top portion of the spring nut clip provides access to the threaded opening in the spring nut, and the legs of the spring nut clip are clipped to the front and back faces of the spring nut, wherein the top portion of the spring nut clip is configured to engage the inwardly facing flanges of the channel beam to inhibit counterclockwise rotation of the spring nut from the installed position when the fastener is being removed from the spring nut, wherein in the top portion of the spring nut clip includes raised elements at opposite sides thereof engageable with the inwardly facing flanges of the channel beam.

2. The fastener system of claim 1, wherein the spring nut clip comprises a stamped and formed piece of sheet metal or spring steel.

3. The fastener system of claim 1, wherein the spring nut clip comprises a molded plastic or a molded metal part.

4. The fastener system of claim 1, wherein the spring nut includes two parallel grooves in the top face in which the inwardly facing flanges are seated when the spring nut is in an installed position.

5. The fastener system of claim 1, wherein the spring nut includes rounded diagonally opposite corners to enable clockwise rotation of the spring nut into the installed position.

6. The fastener system of claim 1, wherein the spring nut has a generally rectangular or parallelogram shape.

7. The fastener system of claim 1, wherein the legs of the spring nut clip are flared at free ends thereof to facilitate insertion on the spring nut.

8. The fastener system of claim 1, wherein the object comprises a bracket, a shelf, a fixture, a conduit, a pipe, or wire cabling.

9. A fastener system comprising:
    a channel beam having base and two sidewalls extending from the base to form a channel, and wherein ends of the sidewalls have inwardly facing flanges defining a slot opening to the channel;
    a spring nut having opposite top and bottom faces, opposite front and back faces, and opposite first and second side faces,
    wherein the front and back faces have a lengthwise dimension extending between the first and second side faces which is greater than the lengthwise dimension of the first and second side faces extending between the front and back faces,
    the spring nut including a coil spring secured to the bottom face,
    the spring nut including a generally centrally located threaded opening on the top face for receiving a fastener to be used to fasten an object to the channel beam,
    wherein the spring nut can be inserted in a desired position in the channel through the slot when front and back faces are aligned with the sidewalls of the channel beam, and then rotated to an installed position wherein that the first and second side faces are aligned with the sidewalls of the channel beam and the top face engages the inwardly facing flanges of the sidewalls, and wherein the coil spring biases the top face toward the inwardly facing flanges; and
    means removably attached to the spring nut engageable with the inwardly facing flanges of the channel beam for inhibiting counterclockwise rotation of the spring nut from the installed position when the fastener is being removed from the spring nut, wherein the means comprises a spring nut clip including a top portion having an opening therein and resiliently deformable legs extending from the top portion, said spring nut clip being removably secured to the spring nut when the spring nut is in the installed position in the channel beam such that the top portion of the spring nut clip is disposed over a portion of the top face of the spring nut, and the opening in the top portion of the spring nut clip provides access to the threaded opening in the spring nut, and the legs of the spring nut clip are clipped to the front and back faces of the spring nut, wherein the top portion of the spring nut clip is configured to engage the inwardly facing flanges of the channel beam, wherein in the top portion of the spring nut clip includes raised elements at opposite sides thereof engageable with the inwardly facing flanges of the channel beam.

10. The fastener system of claim 9, wherein the spring nut clip comprises a stamped and formed piece of sheet metal or spring steel.

11. The fastener system of claim 9, wherein the spring nut clip comprises a molded plastic or a molded metal part.

12. The fastener system of claim 9, wherein the spring nut includes two parallel grooves in the top face in which the inwardly facing flanges are seated when the spring nut is in an installed position.

13. The fastener system of claim 9, wherein the spring nut includes rounded diagonally opposite corners to enable clockwise rotation of the spring nut into the installed position.

14. The fastener system of claim 9, wherein the spring nut has a generally rectangular or parallelogram shape.

15. The fastener system of claim 9, wherein the legs of the spring nut clip are flared at free ends thereof to facilitate insertion on the spring nut.

16. The fastener system of claim 9, wherein the object comprises a bracket, a shelf, a fixture, a conduit, a pipe, or wire cabling.

* * * * *